United States Patent
Gast (10) Patent No.: US 7,104,053 B2
(45) Date of Patent: Sep. 12, 2006

(54) CONTROL METHOD

(75) Inventor: Garr G. Gast, Whitesboro, NY (US)

(73) Assignee: Goodrich Corporation, Charlotte, NC (US)

( * ) Notice: Subject to any disclaimer, the term of this patent is extended or adjusted under 35 U.S.C. 154(b) by 32 days.

(21) Appl. No.: 10/487,494

(22) PCT Filed: Aug. 21, 2002

(86) PCT No.: PCT/IB02/03727

§ 371 (c)(1),
(2), (4) Date: Sep. 1, 2004

(87) PCT Pub. No.: WO03/019302

PCT Pub. Date: Mar. 6, 2003

(65) Prior Publication Data

US 2005/0000351 A1 Jan. 6, 2005

(30) Foreign Application Priority Data

Aug. 25, 2001 (GB) ................................. 0120747.1

(51) Int. Cl.
*G05B 19/19* (2006.01)
(52) U.S. Cl. .............................. 60/420; 60/426; 60/403
(58) Field of Classification Search ................... 60/426, 60/420, 403, 405, 430; 91/359, 361, 459
See application file for complete search history.

(56) References Cited

U.S. PATENT DOCUMENTS

| | | | |
|---|---|---|---|
| 4,951,549 A | * | 8/1990 | Olsen et al. .............. 91/363 R |
| 5,074,495 A | * | 12/1991 | Raymond ..................... 60/430 |
| 5,740,988 A | | 4/1998 | Ausdenmoore |
| 5,791,596 A | * | 8/1998 | Gautier et al. ............ 244/76 R |
| 6,109,021 A | * | 8/2000 | Hanley et al. ................. 60/204 |
| 6,206,329 B1 | | 3/2001 | Gautier et al. |

FOREIGN PATENT DOCUMENTS

| | | |
|---|---|---|
| EP | 0 321 758 | 6/1989 |
| WO | WO 00/16464 | 3/2000 |

OTHER PUBLICATIONS

Copy of International Search Report for PCT/IB02/03727 completed Aug. 22, 2003.
U.S. Appl. No. 60/092,942, filed Jul. 15, 1998, Stephen B. Croke.
Copy of Examination Report for corresponding European Appl. No. 02 767 777.2 dated Dec. 7, 2004.

* cited by examiner

*Primary Examiner*—Igor Kershteyn
(74) *Attorney, Agent, or Firm*—Alston & Bird LLP (57) ABSTRACT

A hybrid actuation system comprises first and second actuator arrangements (10, 12) arranged to apply first and second output loads respectively to a common element (14). A control method for controlling the operation of the hybrid actuation system includes the steps of supplying first and second demand signals to the first and second actuator arrangements (10, 12) respectively to cause movement of the common element (14) into a demanded position, monitoring the first and second output loads applied by the first and second actuator arrangements (10, 12) and generating an output signal indicative of the difference between the first and second output loads. The first and second demand signals are corrected in response to the output signal to compensate for any difference between the first and second output loads, thereby to ensure the first and second output loads applied to the common element (14) are substantially identical and synchronized.

15 Claims, 5 Drawing Sheets

CONTROL METHOD

FIELD OF THE INVENTION

The invention relates to a control method for controlling the operation of an actuation system comprising first and second actuator arrangements arranged to drive a common element or object.

BACKGROUND OF THE INVENTION

Known hydraulic actuation systems may include two servo actuator arrangements, each being arranged to drive opposite ends or different regions of a common element. Each servo actuator arrangement includes a linear actuator having first and second opposing end chambers. The pressure of fluid within the first and second chambers, and hence the position of the actuator, is controlled by means of an electrohydraulic servo valve. The servo valve is supplied with an electrical current which energises a winding of the servo valve to control the position of a spool valve and, hence, the flow of fluid to the first and second chambers of the actuator.

In some applications, it has been recognised that the use of electric actuator systems, as opposed to hydraulic systems, offers the potential for increased reliability and efficiency and reduced weight and manufacturing cost. One type of actuation system that uses direct electrical power for actuation is commonly referred to as an electrohydrostatic or electro hydraulic actuator (EHA). Another type is an electromechanical actuator (EMA). Both EHA and EMA systems employ a servomotor arrangement to control motor operation so as to position a linear actuator. Both systems rely on changes of motor speed and direction to convert rotary energy produced by the electric motor to linear actuator energy. In an EHA system, the energy transformation is through a hydraulic medium charged by a fixed displacement pump, whereas in an EMA system the transformation is by mechanical means.

Another type of electric actuation system is an Integrated Actuation Package (IAP) such as that described in U.S. Ser. No. 60/092,942, in which the control of the displacement of a hydraulic pump (i.e. the control of hydraulic flow rate and flow direction) is used to position a linear actuator. IAP systems typically include a fixed speed, unidirectional electric motor powered by an electrical source, a hydraulic servo pump and a linear hydraulic actuator. A control system is arranged to control the position of the actuator by changing the displacement of the servo pump to vary the hydraulic pump output flow rate and flow direction in response to actuator command signals and position error signals.

As an intermediate step towards using only electric actuation systems, for some applications it has been proposed to drive an object by means of a dual servo/electric actuator arrangement, the servo actuator being arranged to drive a first part of the object and the electric actuator being arranged to drive another part of the object remotely spaced from the first part. However, due to the different operating characteristics of the electric actuator and the servo actuator, there can be undesirable differences in the load applied by each actuator and the relative timing of the applied loads. This can result in excessive energy waste and undesirable stresses being applied to the driven object.

BRIEF SUMMARY OF THE INVENTION

It is an object of the present invention to provide a control method for controlling the operation of an actuation system which removes or alleviates the aforementioned problem.

According to a first aspect of the present invention, there is provided a control method for controlling the operation of a hybrid actuation system comprising first and second actuator arrangements arranged to apply first and second output loads respectively to a common element, the method comprising the steps of:

supplying first and second demand signals to the first and second actuator arrangements respectively to cause movement of the common element into a demanded position, monitoring the first and second output loads applied by the first and second actuator arrangements and generating an output signal indicative of the difference between the first and second output loads, and correcting the first and second demand signals in response to the output signal to compensate for any difference between the first and second output loads, thereby to ensure the first and second output loads applied to the common element are substantially identical and synchronised.

The invention has particular application in hybrid actuation systems comprising a first, electric actuator arrangement and a second, servo actuator arrangement.

It has been proposed to use such systems in aircraft for driving a flight control surface of the aircraft wing. A particular advantage is obtained in larger, commercial aircraft for civilian passengers, for which weight considerations are especially important. However, as the operating characteristics of electric and servo actuators are different, a command signal to initiate movement of the flight control surface into a demanded position can result in different output loads being applied to the surface by the first and second actuators. Even if the first and second actuators are moved into the same, demanded position, the application of different output loads across the common element induces undesirable stresses within the common element and results in system inefficiency.

The present invention provides the advantage that, by correcting the first and second demand signals supplied to the electric and servo actuators to compensate for the differences in their operating characteristics, the first and second output loads applied to the common flight control surface can be substantially matched and synchronised so as to avoid these problems.

In a preferred embodiment, the method comprises the step of generating a load difference signal representative of the difference between the first and second output loads and adjusting the first and second demand signals in response to the load difference signal.

If the first actuator arrangement takes the form of an electro hydraulic actuator, for example, the method may comprise the step of generating a differential fluid pressure difference signal representative of the difference between the first and second output loads and adjusting the first and second demand signals in response to the differential fluid pressure difference signal.

Preferably, the method comprises the steps of:

providing first and second actuator arrangements, each comprising respective first and second control chambers and a respective piston member which is coupled to the common element and is exposed to fluid pressure within the respective first and second control chambers, controlling the fluid pressure within the respective first and second control chambers of the first and second actuator arrangements, thereby to control the position of the respective piston member, calculating a first difference in fluid pressure between the first and second control chambers of the first actuator arrangement and a second difference in fluid pressure between the first and second control chambers of the second actuator arrangement, calculating the difference between said first and second differences to generate the corresponding differential fluid pressure difference signal, and applying a correction to at least one of the first and second demand signals supplied to the first and second actuator arrangements respectively in response to the differential fluid pressure difference signal.

Preferably, the step of correcting the first and second demand signals in response to the differential fluid pressure difference signal to compensate for a difference between the first and second output loads is achieved by means of a Proportional, Integral, and Derivative (PID) feedback and control algorithm.

The method preferably includes the step of controlling the position of the first and second actuator arrangements using a position control algorithm including the steps of:

generating a position command signal to cause movement of the common element to the demanded position, calculating the difference between the position command signal and an average current position of the first and second actuator arrangements and, using the difference to deduce the first and second demand signals required to cause movement of the firs and second actuator arrangements, and hence of the common element, into the demanded position.

Typically, electric and servo actuators will have dead bands of different duration (i.e. the period, following receipt of a demand signal, when there is no actuator response). The dead band arises partially due to the time taken for sufficient fluid pressure to build up in the control chambers of the actuators to cause the actuator to move. The dead band will also be influenced, to a lesser extent, by the reaction time of the servo valve in each actuator.

The method may also comprise the further step of adjusting the relative timing of the first and second demand signals to compensate for differences in the dead bands of the first and second actuator arrangements. By adjusting the relative timing of the first and second demand signals, the matched first and second output loads applied to the common element can be substantially synchronised.

The first and second demand signals have associated first and second gain factors respectively. Preferably, the method also comprises the step of adjusting the first and second gain factors in the region of the dead band for the respective actuator.

Alternatively, if the first actuator arrangement takes the form of an EMA, and the electric actuator may have, associated therewith, an alternative load sensing means to measure the load applied by the electric actuator. If the electric actuator is mechanically coupled to the common element, as opposed to being hydraulically coupled, the load sensing means is provided to measure the output load applied by the electric actuator to the common element. In this embodiment of the invention, a load difference signal is calculated between the first output load applied by the electric actuator, as provided by the load sensing means, and the second output load applied by the servo actuator, as represented by the difference in fluid pressure between the first and second control chambers of the servo actuator.

According to a second aspect of the present invention, a hybrid actuation system comprises:

first and second actuator arrangements for applying first and second output loads respectively to a common element, and processor means for supplying first and second demand signals to the first and second actuator arrangements respectively to cause movement of the common element into a demanded position, for monitoring the first and second output loads applied by the first and second actuator arrangements and for generating an output signal indicative of the difference between the first and second output loads, and for correcting the first and second demand signals in response to the output signal to compensate for any difference between the first and second output loads, thereby to ensure the first and second output loads applied to the common element are substantially identical and synchronised.

The first actuator arrangement may be an electro hydraulic actuator (EHA) or an electro mechanical actuator (EMA), and the second actuator arrangement is preferably a servo actuator.

It will be appreciated that, although the invention is specifically addressing the problems encountered when dual electric/servo actuation systems are employed to drive a common flight control surface of an aircraft, the invention is equally applicable to dual actuation systems for which nominally identical actuators are used, but for which there are slight differences in the actuator performance characteristics, for example due to manufacturing variations or wear during service life.

BRIEF DESCRIPTION OF THE SEVERAL VIEWS OF THE DRAWING(S)

The invention will now be described, by way of example only, with reference to the accompanying figures in which.

DETAILED DESCRIPTION OF THE INVENTION

Figure 1:
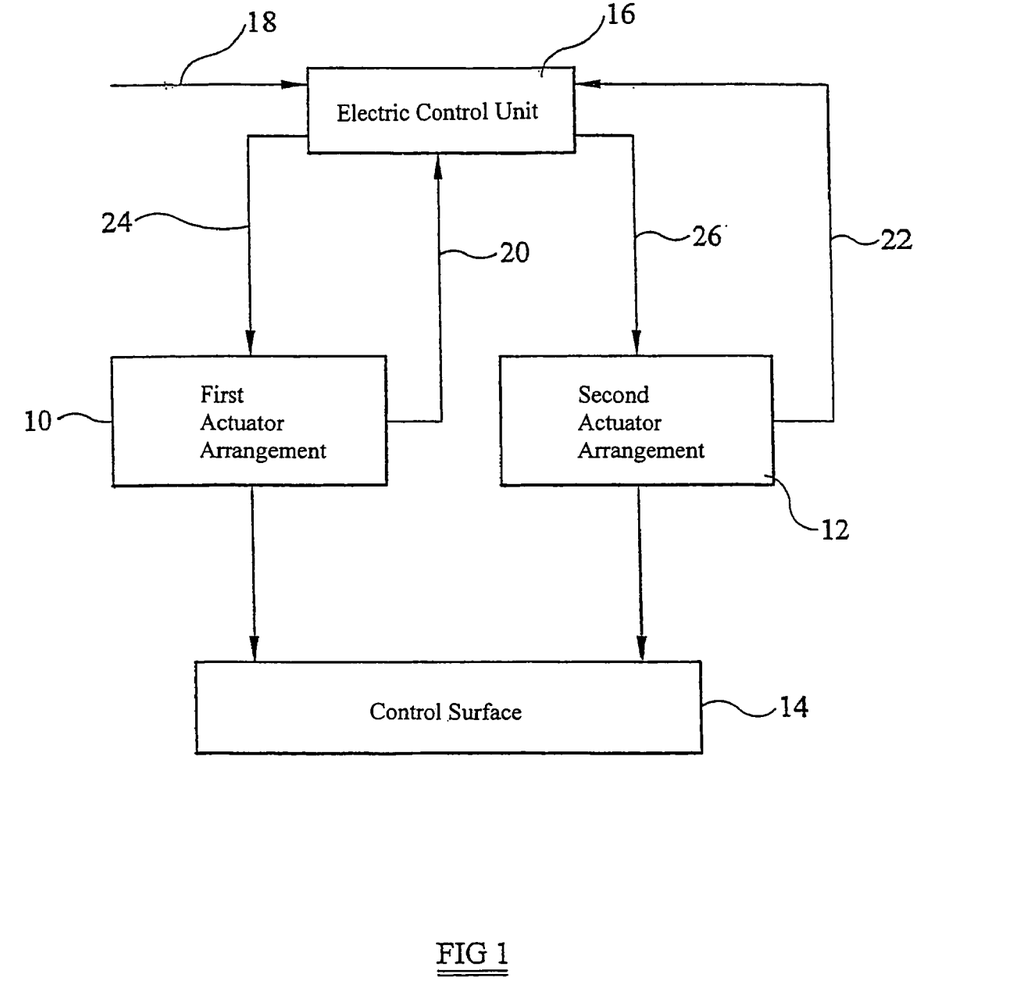
FIG. 1 is a schematic diagram of a hybrid actuation system comprising an electric actuator and a servo actuator.

Referring to FIG. 1, there is shown a hybrid actuation system comprising first and second actuator arrangements 10, 12 respectively for controlling the position of a common flight control surface 14 of an aircraft wing. The first actuator arrangement 10 takes the form of an electric actuator, such as an electro hydraulic actuator (EHA), in which rotary energy produced by an electric motor is transformed to a linear actuator output load via hydraulic or mechanical means. The second actuator arrangement 12 takes the form of a servo actuator in which a linear actuator output is driven directly by means of an electrohydraulic servo valve arranged to control the flow of fluid to control chambers of the linear actuator.

The electric actuator 10 is arranged to apply an output load to a first region of the control surface 14, the servo actuator 12 being arranged to apply an output load to a second region at the opposite end of the control surface 14. The actuator output loads applied to the control surface 14 by each of the actuators 10, 12 are controlled by means of an electronic control unit 16 arranged to receive a position command signal 18 and feedback signals 20, 22 representing various operating parameters of the electric and servo actuators 10, 12 respectively, including an actuator position sensor and a differential pressure signal between the electric and servo actuators 10, 12, as will be described in further detail hereinafter.

The electric actuator 10 may alternatively take the form of an EMA provided with an alternative load sensing means, and the sensed operating parameter will include load or force, as opposed to a differential fluid pressure measurement for an EHA.

In response to the position-command signal 18 and the feedback signals 20, 22, the control unit 16 supplies first and second demand signals 24, 26 to the electric and servo actuators 10, 12 respectively so as to move the flight control surface 14 into the demanded position. As will be described in further detail hereinafter, this is implemented in software loaded onto the control unit 16, for example the aircraft computer processor, by means of a position control algorithm and a differential pressure control algorithm.

If the actuator arrangement includes an EMA, as opposed to an EHA, a load control algorithm is used to move the actuators in response to the position command and feedback signals, as opposed to a differential pressure control algorithm.

Figure 2:
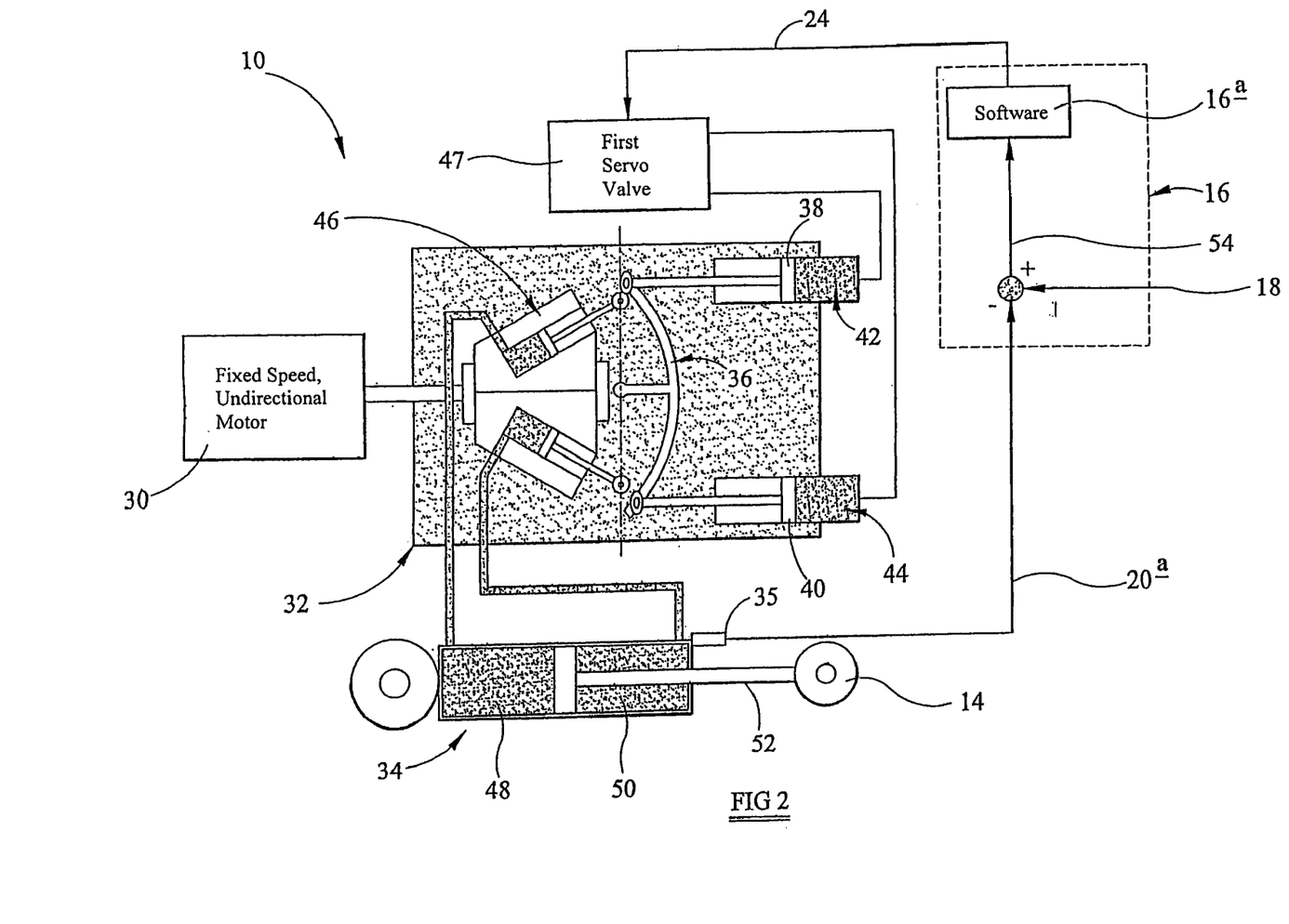
FIG. 2 is a schematic diagram of an electric actuator in the form of an Integrated Actuation Package (SAP) which may be used in the system in FIG. 1.

FIG. 2 shows an example of an electric actuator 10 which may form part of the hybrid actuation system in FIG. 1. The electric actuator 10 takes the form of an Integrated Actuation Package (IAP) in which the control of a hydraulic flow rate and flow direction is used to position a linear actuator. The IAP system includes a fixed speed, unidirectional motor 30 powered by an electrical source (not shown), a hydraulic servo pump, referred to Generally as 32, and a linear actuator 34 comprising an actuator piston 52 which is coupled to the surface 14. The hydraulic servo pump 32 takes the form of a swash plate pump having a swash plate 36 which is operable to control the displacement of a variable displacement piston pump 46. The position of the swash plate 36 is controlled by first and second swash plate control pistons 38, 40 respectively coupled to opposite ends of the swash plate 36. The first and second swash plate control pistons 38, 40 are exposed to fluid pressure within first and second control piston chambers 42, 44 respectively, the pressure of fluid within the chambers 42, 44 being controlled by means of a first servo valve 47 which controls the flow rate of fluid to the chambers 42, 44 under the control of the electronic control unit 16.

The variable displacement piston pump 46 is arranged to control the supply of hydraulic fluid to first and second control chambers 48, 50 respectively of the linear actuator 34. By controlling the flow of fluid to the first and second control chamber 48, 50, the pressure of fluid within the chambers 48, 50 can be varied so as to vary the output load applied by the actuator piston 52 to the surface 14. If the force acting on the actuator piston 52 due to fluid pressure within the first control chamber 48 exceeds the force acting on the actuator piston 52 due to fluid pressure within the second control chamber 50, the actuator piston 52 will be urged to the right in the illustration shown. Conversely, if the force acting on the actuator piston 52 due to fluid pressure within the first control chamber 48 is less that that due to fluid pressure within the second control chamber 50, the actuator piston 52 will be urged to the left. Thus, by controlling fluid pressures within the first and second control chambers 48, 50 by means of the servo pump 32, the output load applied to the control surface 14 can be varied so as to move the flight surface 14 to the demanded position. The linear actuator 34 is also provided with a differential pressure sensor (not shown) which generates a differential pressure output signal representative of the difference in fluid pressure between the first and second control chambers 48, 50. It will be appreciated that the output load applied to the control surface 14 by the actuator piston 52 to move the surface 14 to the demanded position will be determined by the differential pressure sensor output signal.

The linear actuator 34 is also provided with a position sensor 35 which is arranged to sense the position of the actuator piston 52 and, hence, of the surface 14. The position sensor 35 generates a position feedback signal 20a which is supplied to the control unit 16 and compared with the position command signal 18 to generate a position error signal 54. The position demand signal 24 supplied to the servo valve 47 is adjusted in software 16a in response to the position error signal 54 so as to move the linear actuator 34 to the demanded position.

Figure 3:
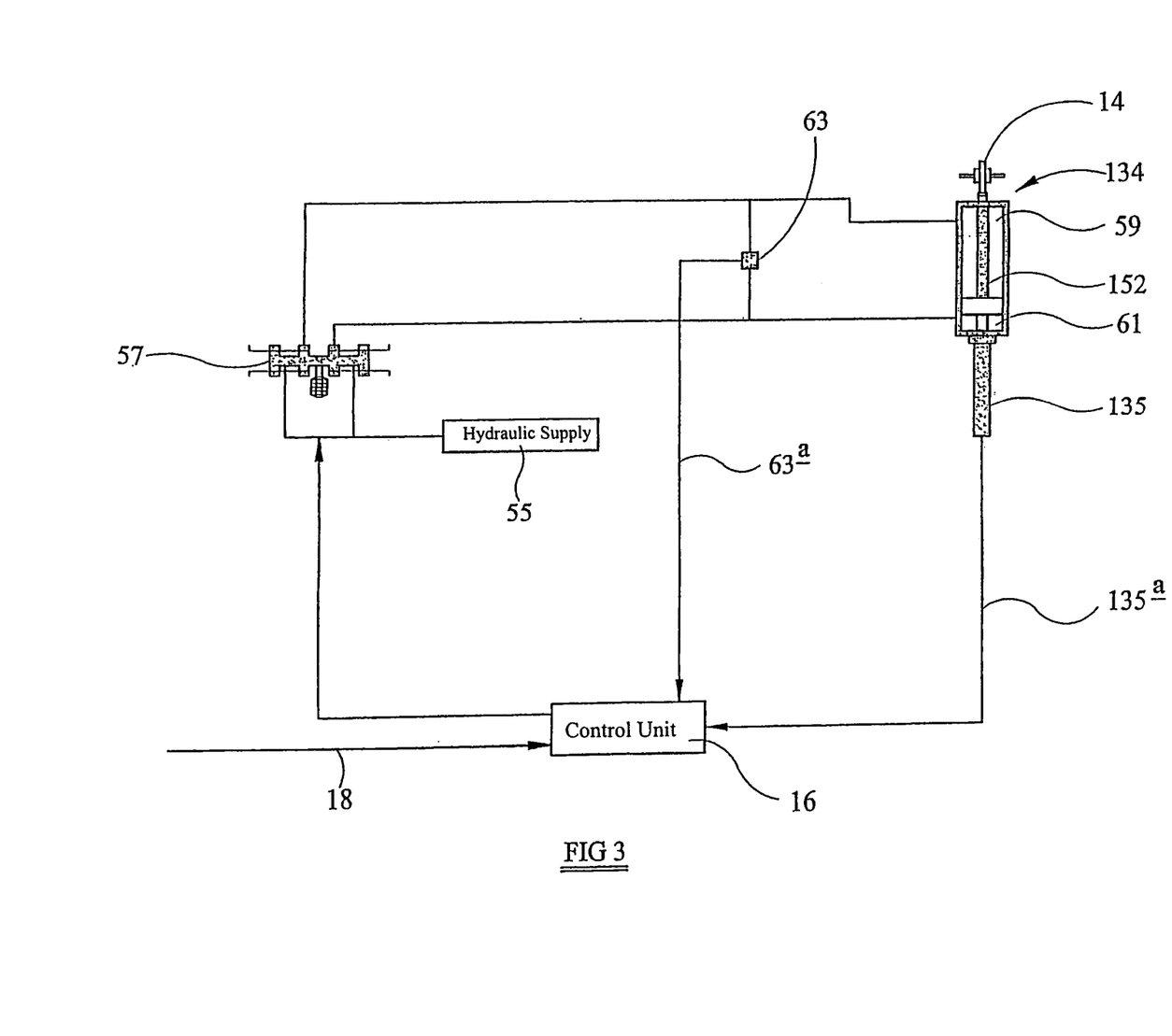
FIG. 3 is a schematic diagram of a servo actuator which may be used in the system in FIG. 1.

Referring to FIG. 3, the servo actuator 12 is typically of the type comprising an electrohydraulic servo valve 57 which is supplied with fluid by means of a constant pressure hydraulic supply 55. A linear actuator 134 including a linear actuator piston 152 similar to that in the electric actuator 10 is controlled by means of the servo valve 57. The servo valve 57 is controlled by means of the control unit 16 in response to a position command signal 18 and a position output signal 135a generated by a position sensor 135 associated with the linear actuator 134 so as to vary fluid pressure in first and second control chambers 59, 61 respectively (as described previously with reference to FIG. 2) and, hence, the output load applied to the control surface 14. Typically, the position sensor 135 takes the form of an LVDT. A differential fluid pressure sensor 63 is also provided for measuring the difference in fluid pressure between the first and second control chambers 59, 61, the output signal 63a generated by the differential fluid pressure sensor 63 being input to the control unit 16 for the purpose of controlling actuator operation, as will be described in further detail hereinafter.

Figure 4:
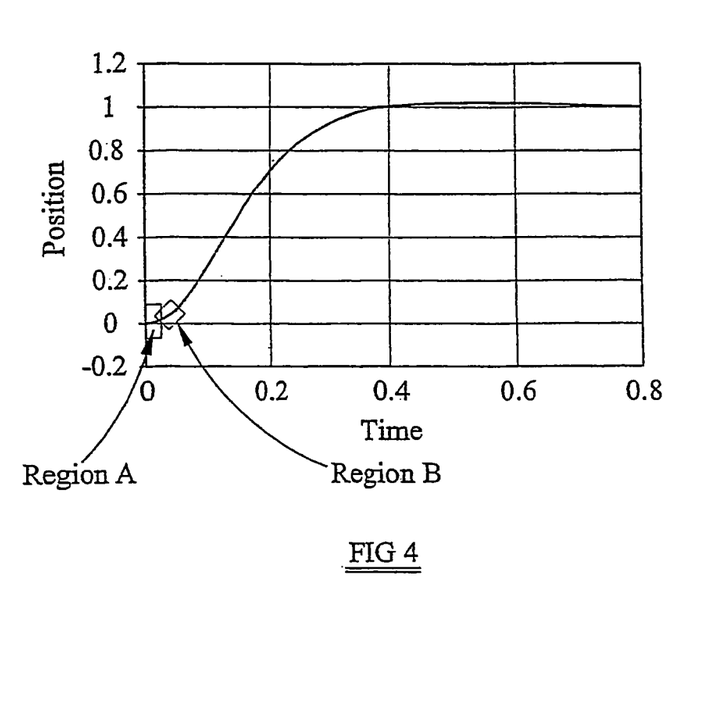
FIG. 4 shows a typical response to a step input command for a servo actuator, as shown in FIG. 3.

FIG. 4 illustrates the response of a typical servo actuator 12 to a step input command signal. The graph shows the relationship between the position of the actuator piston forming part of the servo actuator as a function of time. Time t=O represents the time at which be command signal 18 to move the actuators to the demanded position is received by the control unit 16. It can be seen that there is an initial delay (Region A) following receipt of the command signal at t=O before which the actuator starts to move (i.e. before the actuator piston 152 starts to move). The initial delay region of the actuator's response is commonly referred to as the "dead band region" and is the period, following receipt of the command signal, for which there is no actuator response.

The response of an electric actuator is similar to that shown in FIG. 4 for the servo actuator 12, except that the duration of each region (Region A and Region B), as well as the rise times, will be different. Due to the different operating principles of the electric and servo actuators, the dead band region (Region A in FIG. 4) of an electric actuator will, in general, be greater than that of a servo actuator. For example, in a servo actuator such as that shown in FIG. 3, the hydraulic supply 55 is always at high pressure and the time lag in differential fluid pressure build up between the first and second control chambers 59, 61 will be influenced by the time for movement of the servo valve 57 and the time for fluid flow in and out of the control chambers 59,61 to achieve the required differential fluid pressure. Before movement of the actuator piston 152 occurs, it is also necessary for sufficient fluid pressure to build up to overcome the friction of the actuator seals (not shown). In an electric actuator such as that shown in FIG. 2, the dead band region is determined by the time for fluid pressure to build up in the piston chambers 42, 44 and for fluid pressure to build up in the control chambers 48, 50 of the linear actuator 34. As the electric actuator 10 inherently has the additional steps of swash plate actuation, swash plate rotation and piston pump flow/pressure development, the dead band region of an electric actuator 10 will be greater than that of a servo actuator 12.

Once the actuators 10, 12 have started to move, the actuators 10, 12 will continue to respond at different rates to the position command signal 18 (see Region B in FIG. 4). For the servo actuator 12, the response in Region B is governed by the electronic control unit processing time, the servo valve reaction time and the time required for fluid pressure to reach the demanded differential pressure and flow rate within the actuator chambers 59, 61. In the electric actuator 10 shown in FIG. 2, the response time is governed by the response time for the swash plate control pistons 38, 40 to cause movement of the swash plate 36 and the time required for fluid pressure and flow rate to reach the demanded levels within the actuator chambers 48, 50.

Figure 5:
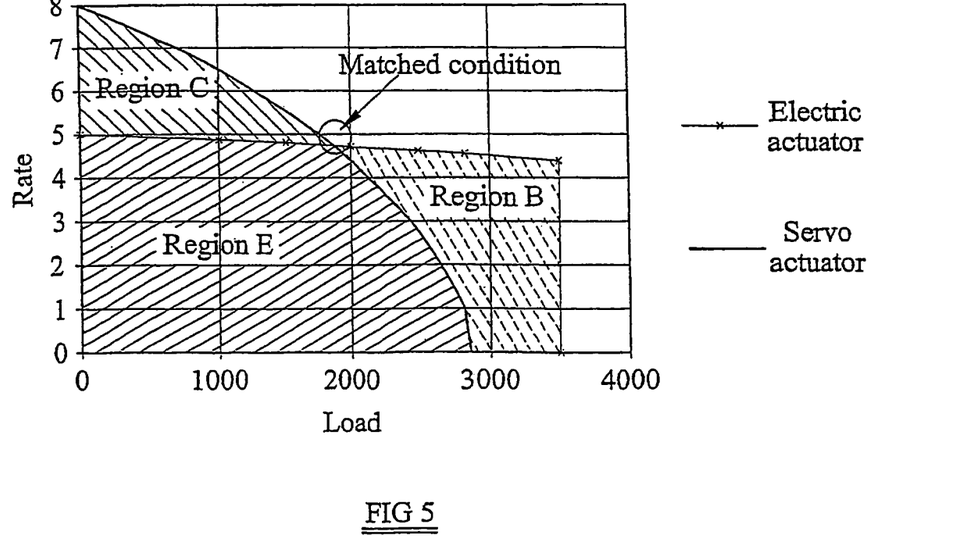
FIG. 5 is a graph to compare the load-rate characteristics of a servo actuator and one type of electric actuator.

The electric and servo actuators 10, 12 also have different load-rate capabilities. FIG. 5 shows the speed of movement of each actuator (arbitrary units) as a function of the output load applied by the actuator (arbitrary units) to the surface 14, the load applied to the surface 14 being determined by the differential fluid pressure between the respective first and second control chambers, as described previously. In FIG. 5, the maximum load of the electric actuator is shown at 3500, the maximum load being determined by the variable displacement piston pump 46. For the servo actuator 12, the maximum load is lower, just below 3000. The load-rate characteristics of the servo and electric actuators 10, 12 are only "matched" just below a load of 2000. In practice, the electric and servo actuators 10, 12 can be matched anywhere in Region E (operational range) by appropriately selecting the gain settings in the actuator channels, providing it is within the capability of the motor or other components of the electric actuator 10. The system cannot operate in Region C as the electric actuator 10 will be dragged by the servo actuator 12 due to the flow capability of the electric actuator channel. It would be possible to operate the system in Region B, but in this region the electric actuator will provide more power than the servo actuator to move the surface 14.

It will be appreciated that particular pressure (or load) at which the matched condition occurs (i.e. just below 2000 in the illustration shown) will be determined by the particular type of actuators employed in the dual actuation system (for example, EMA, EHA or IAP) and the gain settings employed in the control feedback loops (as will be described in further detail hereinafter). The matched condition may also be determined by the electric actuator and servo actuator component design.

It is desirable for the output loads applied by the actuators 10, 12 to the different regions of the control surface 14 to be substantially identical and substantially synchronised so as to prevent undesirable torque being applied to the control surface 14. The different load-rate characteristics of the servo and electric actuators 10, 12 give rise to undesirable 'force fight' between the actuators which occurs when the differential fluid pressure across the electric actuator 10 (i.e. the difference in fluid pressure in the first and second control chambers 48, 50 of the electric actuator 10) is of opposite 'sign' to the differential fluid pressure across the servo actuator 12. Any force fight between the two actuators 10, 12 can cause damage to the surface 14 and introduces undesirable system inefficiencies. Different load rate characteristics of the servo and electric actuators 10, 12, can also give rise to a load or pressure differential mis-match in the actuation system, which is defined as the difference between the differential fluid pressure across the actuator piston 52 of the electric actuator 10 and the differential fluid pressure across the actuator piston 152 of the servo actuator 12.

Figure 6:
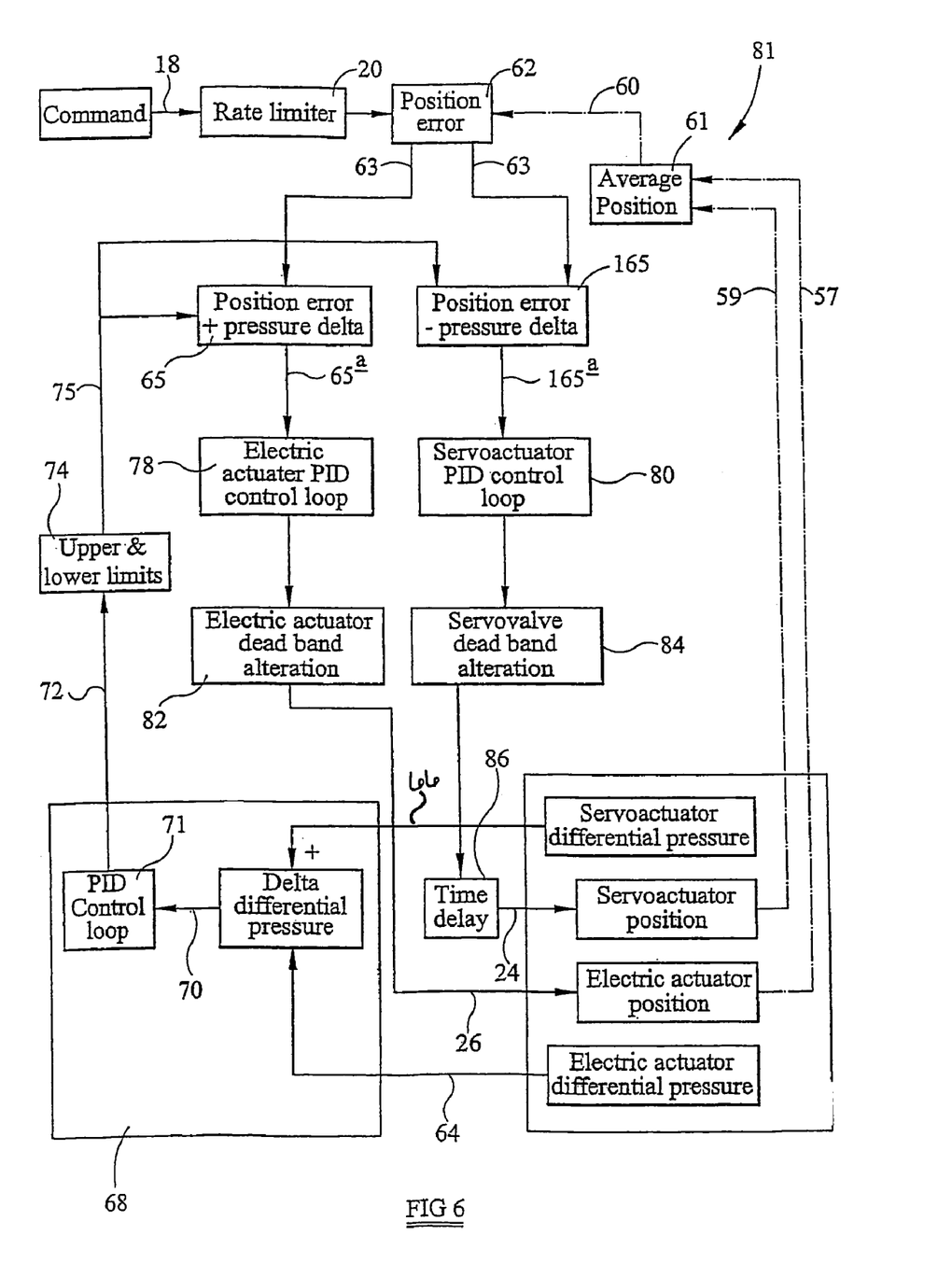
FIG. 6 is a flow diagram to illustrate the steps of a control method in accordance with a preferred embodiment of the present invention.

FIG. 6 is a flow diagram to illustrate a control method which enables the different response characteristics of the actuators 10, 12 to be compensated for, and to ensure the output loads applied to the surface 14 by the electric and servo actuators 10, 12 are synchronised and substantially identical. The command signal 18 representative of the position to which the control surface 14 is to be moved is input to the control unit 16. The command signal 18 is rate limited at step 20, as would be familiar to a person skilled in the art, so as to ensure the surface 14 is not moved at a rate which exceeds a predetermined, safe level.

The control algorithm comprises a position control loop 81 (shown, in part, in dashed lines) and a pressure differential control loop. The position control loop is arranged to adjust the position of the actuators 10, 12 in response to the position command signal 18 and the measured position signals 57, 59 of the electric and servo actuators respectively 10, 12. Position signal 57 indicative of the current position of the electric actuator 10 and position signal 59 indicative of the current position of the servo actuator 12 are used to derive an average position of the control surface 14 at step 61. An average position signal 60 is generated and is compared with the rate limited command signal 18 at step 62 so as to deduce a positional error signal 63.

In the pressure differential control loop, differential pressure output signals 64, 66 representative of the difference in fluid pressure across the respective actuators 10, 12 are fed back to a pressure compensation algorithm 68. The pressure compensation algorithm 68 calculates the difference between the differential pressure signals 64, 66 and generates a differential-pressure difference signal 70. The differential-pressure difference signal 70 is applied to a Proportional-Integral-Derivative (PID) control loop 71 which generates an output signal 72.

As mentioned previously, if the actuator arrangement includes an EMA, as opposed to an EHA, a load control loop is implemented (as opposed to a difference pressure control loop) in a similar manner.

In the present invention the primary function of the PID control loop is to multiply the error value represented by the differential-pressure difference signal 70 by a first gain (the 'Proportional' step). The secondary step is to calculate the integral of the signal over a time interval and to multiply the output by a second gain (the 'Integral' function). Thirdly, the derivative of the signal is determined (the 'Derivative' function) and multiplied by a third gain. The three signals (Proportional, Integral, Derivative) are then added together to give one signal which is used to control the actuator. The 'Proportional' step accounts for the majority of the actuator response, and the 'Integral' and 'Derivative' steps alter the response of the actuator from that of a simple proportional feedback control loop.

The operation of a PID control loop would be familiar to a person skilled in this field of technology. A description of the theory behind PID control can be found in the following publications: "Control System Design Guide" by George Ellis [Academic Press, London, 1991], "Digital Control of Dynamic Systems" by George Franklin, J. David Powell and Michael Workman [Addison Wesley, Menlo Park, Calif., 1998] and "Understanding PID Control" by Vance Van-Doren (Control Engineering, June 2000 issue).

The output signal 72 from the pressure compensation algorithm 68 is limited at step 74 to prevent the feed back of excessive differential-pressure difference signals, thereby generating a limited pressure compensated output signal 75. The derived positional error signal 63 is corrected at steps 65 and 165 (corresponding to the electric and servo actuator channels respectively) to compensate for the difference between the differential pressure across the servo actuator 12 and that across the electric actuator 10. This is achieved by adding the limited pressure compensated output signal 75 to the derived positional error signal 63 at step 65 and subtracting the limited pressure compensated output signal 75 from the derived positional error signal 63 at step 165.

Output signals 65a and 165a from steps 65 and 165 respectively are input to respective electric actuator and servo actuator PID control loops at steps 78, 80 respectively. The electric actuator and servo actuator PID control loops correct the current value of the corrected position error signal by multiplying the corrected position error signal by a gain factor (the 'Proportional' step), calculating the integral of the error signal over a recent time interval (the 'Integral' step) and calculating the derivative of the signal (the 'Derivative' step). The signals from the Proportional, Integral and Derivative steps are then added together to give one output control signal. The use of PID control loops in this way ensures a satisfactory load match between the electric and servo actuators at a given load and rate condition.

It will be appreciated that gain factors are applied to each of the actuator demand signals to maximise the response. In the dead band region, the gain is a maximum, thereby minimising the period for which the actuator does not respond (i.e. to ensure the actuator moves out of the dead band region as quickly as possible). As soon as the actuator starts to move, the gain factor must be reduced to avoid oscillatory behaviour. The gain factors associated with the demand signals in the electric and servo actuator channels are adjusted at steps 82, 84 respectively to take into account the dead band region of the respective actuator and to ensure one actuator is not in the dead band region whilst the other is slightly out of its dead band region performing all the work of holding/moving a load.

A more detailed description of a dead band alteration process is described, for example, on page 322–329 of 'Control of Fluid Power: Analysis and Design by D McLoy and H R Martin, [John Wiley & Sons, New York 1980]. Other techniques may be applied, such as adding dither, as described on pages 440–445 in 'Digital Control of Dynamic Systems' by Franklin, Powell and Workman [pub. Addison Wesley, Menlo Park, Calif., 1998] and on pages 49–51 of 'Control System Design Guide' by George Ellis [pub. Academic Press, London, 1991].

As the servo actuator responds more quickly to a command signal, a time delay is introduced at step 86 to delay the command signal to the servo actuator, thereby ensuring initial movement of the servo actuator 12 matches that of the electric actuator 10.

Following adjustment to compensate for the difference in differential fluid pressure across the electric and servo actuators 10, 12 and to compensate for the dead band differences of the actuators, the respective position demand signals 24, 26 (also shown in FIG. 1) are input to the servo valves of the actuators 10, 12 respectively to cause movement of the actuators towards the demanded position. The iterative control process is repeated until the commanded position is acquired by the actuators 10, 12. The use of the differential pressure difference signal 70, the use of the PID control loops 78, 80, the use of the dead band gain alteration steps 82, 84 and the use of the time delay step 86 ensures the output loads applied by the electric and servo actuators 10, 12 are synchronised and substantially identical. Thus, any force mis-match or force fight between the two actuators 10, 12 which may otherwise result in damage being caused to the surface 14 can be substantially minimised to an acceptable level.

Appropriate gain factors are determined for the position control loop, as well as for the differential pressure loop nested within the position control loop. The determination of appropriate band width and gain settings for the position and differential pressure loops is performed separately for the dead band (Region A) and the subsequent time period when the actuator has started to move (for example, Region B in FIG. 4). The differential pressure loop gains are also maintained at a low enough threshold to ensure stability of the overall system. It would be appreciated by a person familiar with this art that there are many methods by which appropriate gain settings can be determined. For example, suitable techniques are described in the following publications: "Control System Design Guide", George Ellis [Academic Press, London, 1991], "Control Engineering Manual", Byron Ledgerwood [McGraw Hill Book Co., New York, 1957], and "Control Engineer's Handbook" by John Truxal [McGraw Hill Book Co., New York, 1958].

It will be appreciated that the electric actuator of the actuator system need not be of the IAP type, but may be an electromechanical actuator (EMA) or an electrohydrostatic actuator (EHA). In an EHA, the motor must accelerate or decelerate the pump to the speed required to accommodate the change in actuator position. To do this, the inertia of the motor and the pump must be overcome to accelerate to the required speed. The pump must also develop flow to the actuator control chambers, the required increase or decrease in fluid pressure must be achieved and friction due to the actuator seals must also be overcome before the actuator is caused to move. The dead band region for an EHA is, thus, typically longer than for a servo actuator.

In an EMA of the type comprising a ball screw output actuator, the dead band region will be determined by the backlash of the balls and the friction between the screw thread and the nut which must be overcome before the actuator is caused to move. In general, an EMA can be designed to have a shorter dead band region than an EHA or an IAP electric actuator, but may still react more slowly than a servo actuator to a command signal. The method of the present invention accounts for the differences in the dead band regions when different actuator systems are employed to control a common output element and will minimise force mis-match during load holding and loaded rate conditions.

If the electric actuator is of the type in which there is a mechanical coupling between the actuator and the driven element or surface (for example, comprising a ball screw output actuator), the method described previously must be adapted by providing a load sensing means to measure the output load applied by the electric actuator to the driven element. Thus, in FIG. 6, the step of measuring the electric actuator differential pressure (as in the position control loop 81) is replaced by the step of measuring the output load applied by the electric actuator. The output load applied by the electric actuator is then compared with the output load applied by the servo actuator, as represented by the differential pressure measurement, and this forms the input to an appropriate PID control loop 71, as described previously.

It will further be appreciated that, although the control method of the present invention as been described in relation to an actuation system comprising an electric actuator and a servo actuator, the method may be applied to any actuation system comprising two or more actuators arranged to drive a common output element where the operating characteristics are different, for example where the actuators have different response times and load-rate characteristics. Thus, the actuation system need not include an electric actuator and a servo actuator.

The invention provides a particular advantage when employed to control the flight control surfaces in large, commercial aircraft, where weight restrictions are an important consideration. The control method permits dual actuation systems, including one hydraulic actuator and one electric actuator, to be used whilst ensuring stresses applied to the surface are reduced by matching the individual actuator output loads.

The control method may also be used to control actuation systems intended for use in applications other than on aircraft.

The invention claimed is:

1. A method for controlling the operation of a hybrid actuation system comprising first and second actuator arrangements (10, 12) for applying first and second output loads respectively to a common element (14), the method comprising:
    supplying first and second demand signals to the first and second actuator arrangements (10, 12) respectively to cause movement of the common element (14) into a demanded position,
    monitoring the first and second output loads applied by the first and second actuator arrangements (10, 12) and generating an output signal indicative of the difference between the first and second output loads, and
    correcting the first and second demand signals in response to the output signal to compensate for any difference between the first and second output loads, thereby to ensure the first and second output loads applied to the common element (14) are substantially identical and synchronised.

2. A method as claimed in claim 1, further comprising generating a load difference signal (70) representative of the difference between the first and second output loads and adjusting the first and second demand signals in response to the load difference signal.

3. A method as claimed in claim 2, comprising generating a differential fluid pressure difference signal (70) representative of the difference between the first and second output loads and adjusting the first and second demand signals in response to the differential fluid pressure difference signal.

4. A method as claimed in claim 3, further comprising:
    providing first and second actuator arrangements (10, 12), each comprising respective first and second control chambers (48, 59, 50, 61) and a respective piston member (52, 152) which is coupled to the common element (14) and is exposed to fluid pressure within the respective first and second control chambers (48, 59, 50, 61),
    controlling the fluid pressure within the respective first and second control chambers (48, 59, 50, 61) of the first and second actuator arrangements (10, 12), thereby to control the position of the respective piston member (52, 152),
    calculating a first difference in fluid pressure between the first and second control chambers (48, 50) of the first actuator arrangement (10) and a second difference in fluid pressure between the first and second control chambers (59, 61) of the second actuator arrangement (12),
    calculating the difference between said first and second differences to generate the corresponding differential fluid pressure difference signal (70), and
    applying a correction to at least one of the first and second demand signals supplied to the first and second actuator arrangements (10, 12) respectively in response to the differential fluid pressure difference signal (70).

5. A method as claimed in claim 2, wherein the step of correcting the first and second demand signals in response to the load difference signal is achieved by means of a proportional, integral, and derivative feedback and control algorithm.

6. A method as claimed in claim 1, including controlling the position of the first and second actuator arrangements (10, 12) using a position control algorithm.

7. A method as claimed in claim 6, including the steps of:
    generating a position command signal (18) to cause movement of the common element (14) to the demanded position,
    calculating the difference between the position command signal (18) and an average current position of the first and second actuator arrangements (10, 12) and,
    using the difference to deduce the first and second demand signals required to cause movement of the first and second actuator arrangements (10, 12) into the demanded position.

8. A method as claimed in claim 1, wherein each of the first and second actuator arrangements (10, 12) has a respective dead band, the method further comprising the step of adjusting the relative timing of the first and second demand signals to compensate for differences in the dead bands of the first and second actuator arrangements (10, 12).

9. A method as claimed in claim 8, comprising synchronising the matched first and second output loads applied to the common element (14).

10. A method as claimed in claim 1, wherein said first and second demand signals have associated therewith first and second gain factors respectively, the method further comprising adjusting the first and second gain factors in the region of the dead band for the respective actuator arrangement (10, 12).

11. A hybrid actuation system comprising
    a first actuator arrangement for applying a first output load to a common element (14),
    a second actuator arrangement for applying a second output load to the common element (14), and
    processor means for supplying first and second demand signals to the first and second actuator arrangements (10, 12) respectively to cause movement of the common element (14) into a demanded position, for monitoring the first and second output loads applied by the first and second actuator arrangements (10, 12) and for generating an output signal indicative of the difference between the first and second output loads, and for correcting the first and second demand signals in response to the output signal to compensate for any difference between the first and second output loads, thereby to ensure the first and second output loads applied to the common element (14) are substantially identical and synchronised.

12. A hybrid actuation system as claimed in claim 11, wherein the first actuator arrangement (10) is an electro hydraulic actuator.

13. A hybrid actuation system as claimed in claim 11, wherein the first actuator arrangement (10) is an electro mechanical actuator.

14. A hybrid actuation system as claimed in claim 11, wherein the first actuator arrangement (10) is an integrated actuation package.

15. A hybrid actuation system as claimed in claim 11, wherein the second actuator arrangement (12) is a servo actuator.

* * * * *